US009581086B2

(12) United States Patent
Tiwari et al.

(10) Patent No.: US 9,581,086 B2
(45) Date of Patent: Feb. 28, 2017

(54) TURBINE OPERATIONAL FLEXIBILITY

(71) Applicant: General Electric Company, Schenectady, NY (US)

(72) Inventors: Awadesh Kumar Tiwari, Bangalore (IN); Mahendhra Muthuralingam, Bangalore (IN); Praveen Kumar Gali, Bangalore (IN)

(73) Assignee: General Electric Company, Schnectady, NY (US)

( * ) Notice: Subject to any disclaimer, the term of this patent is extended or adjusted under 35 U.S.C. 154(b) by 496 days.

(21) Appl. No.: 14/136,835

(22) Filed: Dec. 20, 2013

(65) Prior Publication Data

US 2015/0176498 A1  Jun. 25, 2015

(51) Int. Cl.
*F02C 9/00* (2006.01)
*G05B 23/02* (2006.01)
*G05B 13/02* (2006.01)

(52) U.S. Cl.
CPC .............. *F02C 9/00* (2013.01); *G05B 13/024* (2013.01); *G05B 23/0283* (2013.01); *G05B 23/0286* (2013.01)

(58) Field of Classification Search
None
See application file for complete search history.

(56) References Cited

U.S. PATENT DOCUMENTS 4,249,238 A     2/1981  Spang, III et al.
4,908,775 A *   3/1990  Palusamy .............. G21C 17/00
                                                  376/249
5,258,923 A    11/1993  Imam et al.
5,311,562 A     5/1994  Palusamy et al.
5,625,153 A     4/1997  Sawai et al.
5,852,793 A    12/1998  Board et al.
6,490,506 B1   12/2002  March
6,789,428 B2    9/2004  Nishimura et al.
7,065,471 B2    6/2006  Gotoh et al.
(Continued)

FOREIGN PATENT DOCUMENTS

EP        1420153 A2     5/2004

OTHER PUBLICATIONS

EP Search Report and Opinion issued in connection with corresponding EP Application No. 14198003.7 on Dec. 4, 2015.

*Primary Examiner* — Christopher E Everett
(74) *Attorney, Agent, or Firm* — Fletcher Yoder, P.C.

(57) ABSTRACT

A device receives sensed operation parameters related to the operation of a machine. The device utilizes the sensed operation parameters in a first analyzer that generates first characteristics related to degradation of the machine and utilizes the sensed operation parameters in a second analyzer configured to generate second characteristics related to thermal characteristics of the machine, wherein the thermal characteristics include thermal stresses present in the machine. The device also utilizes the first and second characteristics and a third characteristic related to operator behaviors related to the current operation of the machine to generate remaining useful life characteristics of components of the machine and generates operational set points for control of the machine based in part on the remaining useful life characteristics, desired machine performance characteristics based on the operator behaviors, and maintenance characteristics of the machine.

20 Claims, 5 Drawing Sheets

(56) References Cited

U.S. PATENT DOCUMENTS

| | | | |
|---|---|---|---|
| 7,243,042 B2 | 7/2007 | Plotts et al. | |
| 7,308,322 B1 * | 12/2007 | Discenzo | G05B 23/0221 |
| | | | 700/175 |
| 7,328,128 B2 * | 2/2008 | Bonanni | G05B 23/0283 |
| | | | 702/182 |
| 7,457,785 B1 | 11/2008 | Greitzer et al. | |
| 8,135,568 B2 | 3/2012 | Pandey et al. | |
| 8,548,750 B1 * | 10/2013 | Garvey | G06N 99/005 |
| | | | 702/34 |
| 2010/0070098 A1 * | 3/2010 | Sterzing | G05B 17/02 |
| | | | 700/287 |
| 2011/0296810 A1 * | 12/2011 | Hardwicke | G05B 23/0283 |
| | | | 60/39.091 |
| 2012/0130688 A1 * | 5/2012 | Jiang | F01D 21/003 |
| | | | 703/2 |
| 2012/0266123 A1 | 10/2012 | Jain et al. | |
| 2012/0290225 A1 | 11/2012 | Julian et al. | |
| 2014/0365178 A1 * | 12/2014 | Schramm | G05B 23/0283 |
| | | | 702/184 |

\* cited by examiner

TURBINE OPERATIONAL FLEXIBILITY

BACKGROUND

The subject matter disclosed herein relates to gas turbine engines, and more particularly to a system and method for flexible operation of a turbine engine using a model-free adaptive framework.

As gas turbine engines operate, various factors influence the wear and thereby the overall life of the engine components. For example, starting cycles, power settings, fuels, and/or levels of steam or water injection directly influence the life of key gas turbine parts and, thus, may be significant factors in determining maintenance intervals. Additionally, gas turbines wear in different ways depending on, for example, their service conditions and, therefore, will have different wear rates depending on the nature of the services. For example, machines put into peak or cyclic duty may be exposed to greater thermal mechanical fatigue, while machines placed into continuous duty or baseline operation may typically experience greater rupture, creep deflection, oxidation, and/or corrosion. Accordingly, operators of gas turbine engines, faced with various operating conditions and scenarios, must often make decisions that prioritize either life of the turbine engine or performance.

Currently, operator decisions are typically based on computation of maintenance factors performed offline (e.g., separate from the operation of the machinery to be monitored) and may account for factors such as fired hours and/or start hours. However, these calculations often neglect to consider accumulated hours of particular ramp rate, or time spent at part load, as well as other complexities of turbine operation. Further, operators tasked with making life calculations may use thermal models to compute metal temperatures that may take several hours to converge, therefore diminishing the utility of such models for real-time application. Additional drawbacks of existing operational decision and control techniques include the lack of consideration of plant dynamics and the use multiple non-integrated models. There is therefore a need for improved operational control techniques that take into account the complexities of turbine operation, plant dynamics, and integrate multiple thermal models to estimate life versus performance in real-time. Accordingly, the present methods and systems utilize historical data, real-time data, current thermal models, and model-free adaptive techniques to provide systems and methods of more flexible control of gas turbine operation. The resulting techniques may allow for reduced and/or minimized costs as well as increased and/or maximized revenues from the operation of turbine engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment includes a device configured to receive sensed operation parameters related to the operation of a machine, utilize the sensed operation parameters in a first analyzer configured to generate first characteristics related to degradation of the machine, utilize the sensed operation parameters in a second analyzer configured to generate second characteristics related to thermal characteristics of the machine, wherein the thermal characteristics include thermal stresses present in the machine, utilize the first characteristic related to degradation of the machine, the second characteristics related to thermal characteristics of the machine, and a third characteristic related to operator behaviors related to the current operation of the machine to generate remaining useful life characteristics of components of the machine, and generate operational set points for control of the machine based in part on the remaining useful life characteristics, desired machine performance characteristics based on the operator behaviors, and maintenance characteristics of the machine.

In a second embodiment, an article of manufacture includes a tangible non-transitory machine-readable media having encoded thereon processor-executable instructions include instructions to receive sensed operation parameters related to the operation of a machine, instructions to apply the sensed operation parameters in a first analyzer configured to generate first characteristics related to degradation of the machine, instructions to apply the sensed operation parameters in a second analyzer configured to generate second characteristics related to thermal characteristics of the machine, wherein the thermal characteristics include thermal stresses present in the machine, instructions to apply the characteristic related to degradation of the machine, the second characteristics related to thermal characteristics of the machine, and a third characteristic related to operator behaviors related to the current operation of the machine to generate remaining useful life characteristics of components of the machine, and instructions to generate operational set points for control of the machine based in part on the remaining useful life characteristics, desired machine performance characteristics based on the operator behaviors, and maintenance characteristics of the machine.

In a third embodiment, a tangible non-transitory machine-readable media includes code configured to determine total remaining useful life of components of a machine based at least upon thermal stresses in the machine, determine a first degradation factor of the machine due to operator behaviors related to the current operation of the machine, determine a second degradation factor related to the duration of time that the machine is active, determine operating costs of the machine related to behaviors related to the operation of the machine, determine system losses at transients and steady state operation based on the operation of the machine, and utilize the total remaining useful life, the first degradation factor, the second degradation factor, the operating costs, and the system losses to generate operational set points for control of the machine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
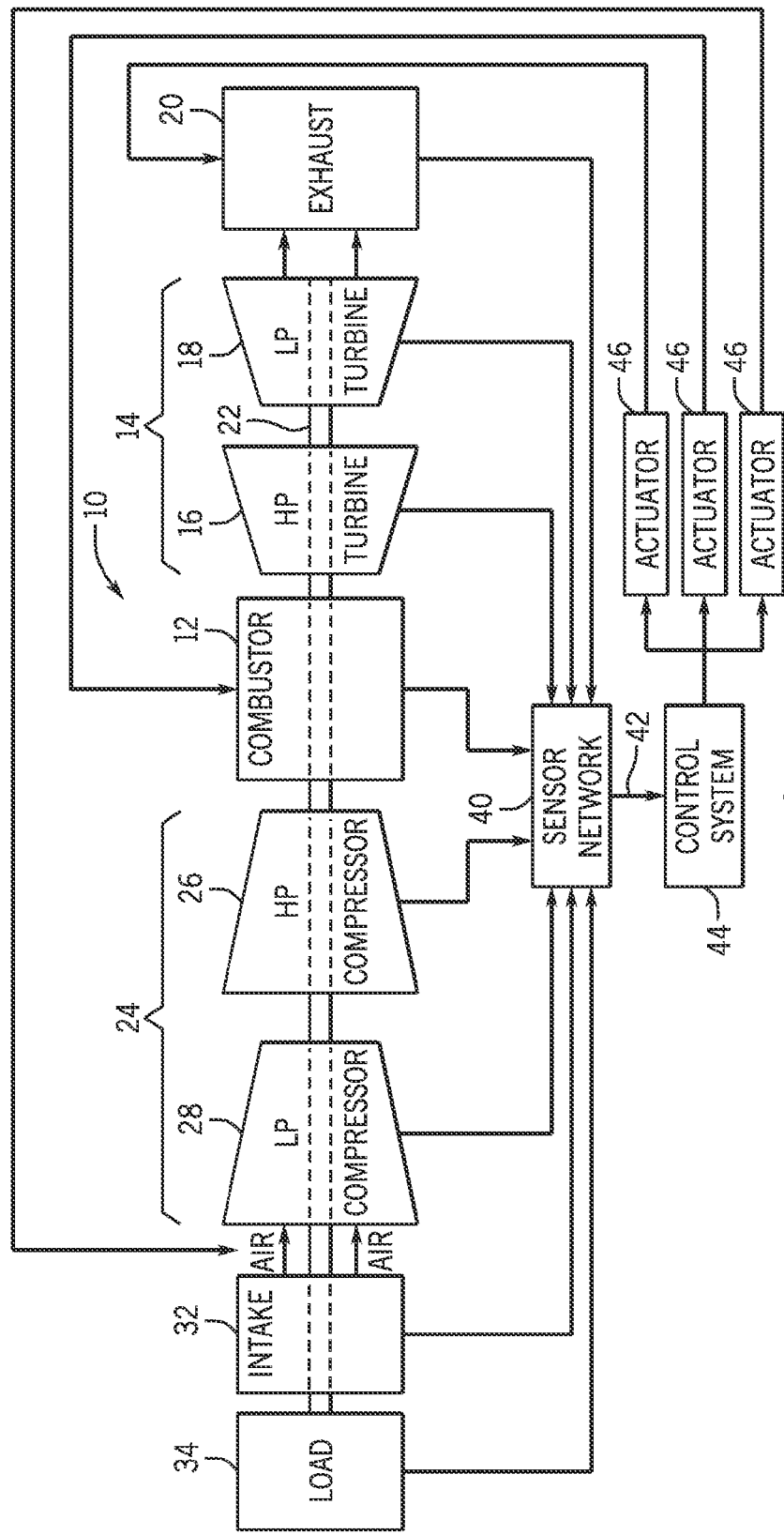
FIG. 1 is a block diagram depicting an embodiment of a system including a gas turbine engine and operationally flexible control system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for monitoring and controlling components or machinery in one or more industrial systems to provide operational flexibility for the machinery. In one embodiment, the machinery may includes a power generation unit, such as a gas turbine, a steam turbine, a wind turbine, as well as similar devices that generate electrical energy, as well as a control system used to dictate how the power generation unit will function. This process may incorporate sensor data received from sensors of the machinery as well as external data. For example, the external data may include historical and real-time cost data, maintenance data, and historical operator behavior data. Through the use of various analyzers, the sensor and external data may be utilized to compute, for example, degradation, thermal, operator behavior, costs, and load analyses. The data resulting from the analyses, including rates of degradation, remaining useful life data, operator penalty factors, total costs, accumulated load and maintenance factors may be utilized by a model-free adaptive framework.

The model-free adaptive framework may incorporate both gas turbine models and fuzzy logic systems (e.g., neural networks) and utilize these models and fuzzy logic systems to find an accumulated remaining useful life and best (enhanced efficiency) operating points. These operating points may then be used to control actuators of the gas turbine system to control the operation of, for example, a gas turbine engine of the gas turbine system. In this manner, maintenance, performance, and life of a gas turbine system may be plotted in an integrated environment. Furthermore, this process accounts for specific variations (e.g., part loads, ramp life of a gas turbine engine, etc.) allows for on the fly calculations of, for example, metal temperatures and life of portions of the gas turbine system, and allows for application of accumulated characteristics of the gas turbine system. Additionally, real time maintenance factor estimations and operation points that include analysis of part life vs. performance for given fuel prices/generated energy sales prices may be generated.

Turning now to the drawings, FIG. 1 illustrates a block diagram showing an embodiment of a system to which the operationally flexible control techniques set forth in present disclosure may be applied. As illustrated, a gas turbine engine or turbine system 10 may use liquid or gas fuel, such as natural gas and/or a hydrogen rich synthetic gas, to run the turbine system 10. For instance, fuel nozzles may intake a fuel supply, mix the fuel with air, and distribute the air-fuel mixture into a combustor 12. The combustion of the air-fuel mixture may create hot pressurized gases within the combustor 12, which may be directed through a turbine section 14 that includes a high-pressure (HP) turbine 16 and a low-pressure (LP) turbine 18, and towards an exhaust outlet 20. In the illustrated embodiment, the HP turbine 16 may be part of a HP rotor, and the LP turbine 18 may be part of a LP rotor. As the exhaust gases pass through the HP turbine 16 and LP turbine 18, the gases may force turbine blades to rotate a drive shaft 22 extending along a rotational axis of the turbine system 10. As illustrated, drive shaft 22 is connected to various components of the turbine system 10, including a HP compressor 26 and a LP compressor 28.

The drive shaft 22 of the turbine system 10 may include one or more shafts that may be, for example, concentrically aligned. The drive shaft 22 may include a shaft connecting the HP turbine 16 to the high-pressure compressor 26 of a compressor section 24 of the turbine system 10 to form a HP rotor. For example, the HP compressor 26 may include compressor blades coupled to the drive shaft 22. Thus, rotation of turbine blades in the HP turbine 16 may cause the shaft connecting the HP turbine 16 to the HP compressor 26 to rotate the compressor blades within the HP compressor 26, which compresses air in the HP compressor 26. Similarly, the drive shaft 22 may include a shaft connecting the LP turbine 18 to a low-pressure compressor 28 of the compressor section 24 to form a LP rotor. Thus, in the illustrated embodiment, the drive shaft 22 may include both an HP and an LP rotor for driving the HP compressor/turbine components and the LP compressor/turbine components, respectively. The LP compressor 28 may include compressor blades coupled to the drive shaft 22. Thus, rotation of turbine blades in the LP turbine 18 causes the shaft connecting the LP turbine 18 to the LP compressor 28 to rotate compressor blades within the LP compressor 28.

The rotation of compressor blades in the HP compressor 26 and the LP compressor 28 may act to compress air that is received via an air intake 32. As shown in FIG. 1, the compressed air is fed to the combustor 12 and mixed with fuel to allow for higher efficiency combustion. Thus, the turbine system 10 may include a dual concentric shafting arrangement, wherein LP turbine 18 is drivingly connected to LP compressor 28 by a first shaft of the drive shaft 22, which the HP turbine 16 is similarly drivingly connected to the HP compressor 26 by a second shaft in the drive shaft 22, which may be disposed internally and in a concentric arrangement with respect to the first shaft. In the illustrated embodiment, the shaft 22 may also be connected to load 34, which may include any suitable device that is powered by the rotational output of turbine system 10. For example, the load 34 could include a vehicle or a stationary load, such as an electrical generator in a power plant or a propeller on an aircraft. In some embodiments, the gas turbine system 10 may be an aeroderivative gas turbine used in marine propulsion, industrial power generation, and/or marine power generation applications. Further, it should be noted that while the turbine system depicted in FIG. 1 is a representation of a cold-end system (e.g., the load 34 is disposed upstream from the intake with respect to the air flow direction), other embodiments may also include hot-end systems (e.g., with the load 34 being disposed downstream from the exhaust 20 with respect to the air flow direction).

To provide turbine performance information to a turbine control system configured to perform techniques enabling operational flexibility, discussed in greater detail below, the gas turbine system 10 may include a set of multiple sensors 40, wherein the sensors 40 are configured to monitor various turbine engine parameters related to the operation and performance of the turbine system 10. The sensors 40 may include, for example, one or more inlet sensors and outlet sensors positioned adjacent to, for example, the inlet and outlet portions of the HP turbine 16, the LP turbine 18, the HP compressor 26, the LP compressor 28, and/or the combustor 12, as well as the intake 32, exhaust section 20, and/or the load 34. Further, the sensors 40 may include measured and/or virtual sensors. As can be appreciated, a measured sensor may refer to a physical sensor (e.g., hardware) that is configured to acquire a measurement of a particular parameter(s), whereas a virtual sensor may be utilized to obtain an estimation of a parameter of interest and may be implemented using software. In some embodiments, virtual sensors may be configured to provide estimated values of a parameter that is difficult to directly measure using a physical sensor.

By way of example, these various inlet and outlet sensors 40, which may include measured and virtual sensors, may sense parameters related to environmental conditions, such as ambient temperature and pressure and relative humidity, as well as various engine parameters related to the operation and performance of the turbine system 10, such as compressor speed ratio, inlet differential pressure, exhaust differential pressure, inlet guide vane position, fuel temperature, generator power factor, water injection rate, compressor bleed flow rate, exhaust gas temperature and pressure, compressor discharge temperature and pressure, generator output, rotor speeds, turbine engine temperature and pressure, fuel flow rate, core speed. The sensors 40 may also be configured to monitor engine parameters related to various operational phases of the turbine system 10. As will be discussed further below, measurements 42 of turbine system parameters obtained by the sensor network 40 may be provided to a turbine control system 44 configured to perform techniques enabling operational flexibility.

The control system 44, as either directed by an operator or operating in an automatic mode, may the adjust actuators 46 within the gas turbine system 10 to regulate the function of the gas turbine system 10 by changing parameters such as fuel flow rate, vane angle, and nozzle area. For example, actuators 46 may include mechanical, hydraulic, pneumatic, or electromagnetic actuators that manage the movement of valves controlling air and fuel flow within air and fuel flow paths of the gas turbine system 10. The specifics of the control system 44 will be detailed below with respect to FIG. 2.

Figure 2:
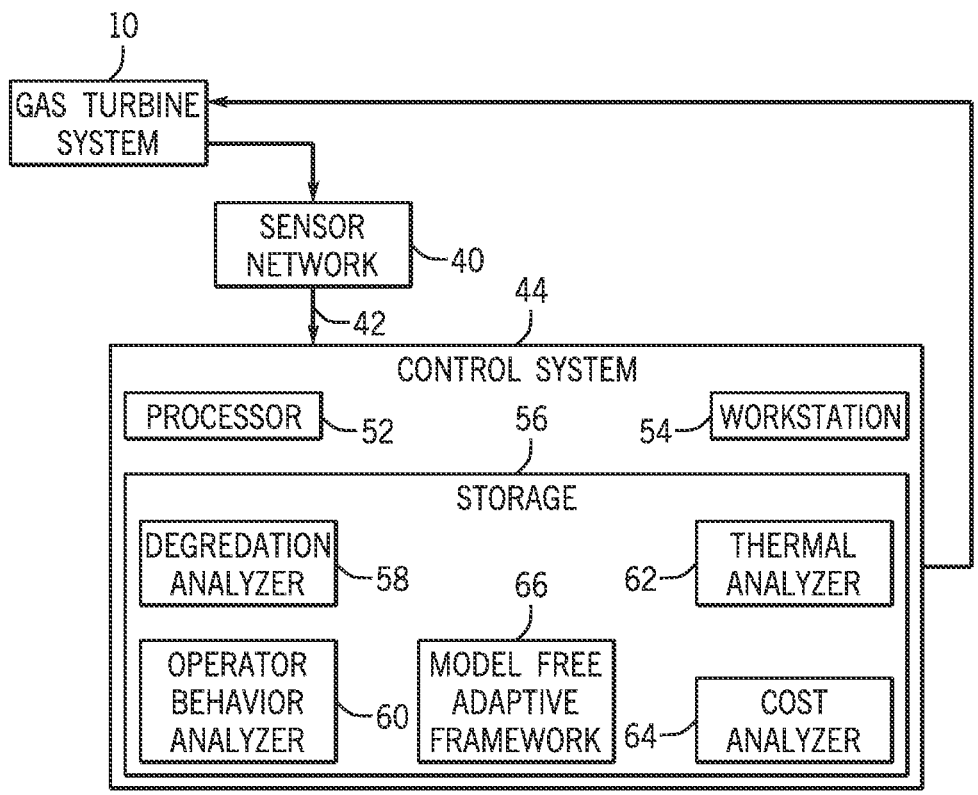
FIG. 2 is a block diagram depicting the gas turbine engine and control system of FIG. 1, illustrating details of the operationally flexible control system, in accordance with an embodiment.

FIG. 2 illustrates a block diagram depicting details of the control system 44 of FIG. 1. The control system 44 includes a processor 52 (e.g., general central processing units (CPUs), embedded CPUs, systems on a chip (SOC), application specific processors, application specific integrated circuits (ASICs), field programmable gate arrays (FPGAs), and their combinations) to execute analysis of historical and real-time turbine parameters, wherein real-time may be a given time period such as, for example, approximately one minute, approximately thirty seconds, approximately fifteen seconds, approximately five seconds, approximately one second, or approximately less than one second. The control system 44 may also include a workstation 54. The workstation 54 may allow an operator to interact with the control system 44 and, accordingly, control the operation of the gas turbine 10.

In some embodiments, processor 52 and/or other data processing circuitry may be operably coupled to memory 56 to execute instructions for carrying out the presently disclosed techniques. These instructions may be encoded in programs that may be executed by the processor 52 to execute instructions for carrying out the presently disclosed techniques. These instructions may be encoded in programs that may be executed by the processor 52. Additionally, the instructions may be stored in any suitable article of manufacturer that includes at least one tangible, non-transitory computer-readable medium that at least collectively stores these instructions or routines, such as the storage 56. The storage 56 may include, for example, random-access memory, read-only memory, rewritable memory, flash memory, and/or other physical storage devices, such as a hard drive and/or optical discs.

Accordingly, the storage 56 may, for example, store instructions executed by the processor 52 to carry out the present analytical techniques. Accordingly, in some embodiments, the storage 56 may contain analysis components including a degradation analyzer 58, an operator behavior analyzer 60, a thermal analyzer 62, and a cost analyzer 64. The storage 56 may additionally contain a model-free adaptive framework 66 that may be utilized by the processor 52 to provide guiding information to an operator of the gas turbine 10 by utilizing received outputs from the multiple analyzers 58, 60, 62, and/or 64. It should be noted that in other embodiments, instead of being present in storage 56, each of analyzers 58, 60, 62, and/or 64, as well as the model-free adaptive network 66, may also include their own respective local processors and store instructions on local storage (non-transitory tangible machine readable medium) to be executed the respective local processors, with the individual results transmitted between one another and to the processor 52 in carrying out the present analytical techniques.

In some embodiments, the workstation 54 may be a human machine interface that may include a display 36 that, for example, may display a graphical user interface (GUI). As should be appreciated, workstation 54 may also include a variety of other components, such as a keyboard, a mouse, a track pad, and/or a touch screen interface, and so forth. Additionally, the workstation 54 may also include input/output (I/O) ports that allow for physical components to be externally coupled to the workstation 54, as well as a network interface to provide communication via a personal area network (PAN) (e.g., Bluetooth), a local area network (LAN) (e.g., Wi-Fi), a wide area network (WAN) (e.g., 3G or LTE), Ethernet, and/or the like.

Additionally, the workstation 54 may be in communicative connection with the processor 52, such as by a local area network, wireless network (e.g., 802.11 standards), or mobile network (e.g., EDGE, 3G, 4G, LTE, WiMAX). That is, the workstation 54 may be located remotely from the processor 52. Alternatively, the workstation 54 may be in the proximity of the other elements of the control system 44 (e.g., in a common housing with the control system or physically coupled to a housing containing the processor 52 and the storage 56). In embodiments where the workstation 56 is located remotely with respect to the other elements of the control system 44 (e.g., the processor 52 and the storage 56), an operator may remotely access the processor 52 via the workstation 54 to receive an output of the control system 44.

In a further embodiment, the control system 44 may also be located either in generally close proximity to the gas turbine system 10 (in a common building) or may be located remotely from a gas turbine system 10. For instance, in one embodiment, a manufacturer of the turbine system 10 may sell or supply the turbine system 10 as well as offer performance monitoring services to monitor the health and performance degradation of the turbine system. These performance monitoring services may be accomplished on-site (e.g., performed by a user/operator of the turbine system 10) or may be accomplished remotely from the physical location of the turbine system 10 (e.g., by a user/operator of the turbine system 10, by the manufacturer of the turbine system 10, or by a third party). Accordingly, in such embodiments, the control system 44 may be located remotely from the turbine system 10, and notification and/or revised set points indicated by the processor 52 may be transmitted to a workstation 54 operated by the client, e.g., by e-mail, text message, or as a notification display in a proprietary application. In other embodiments, the control system 44 and/or workstation 54 may be designated as an integrated component of the turbine system 10, and may both be located in the proximity of the turbine system 10 (e.g., in a common room or building with the turbine system 10).

Figure 3:
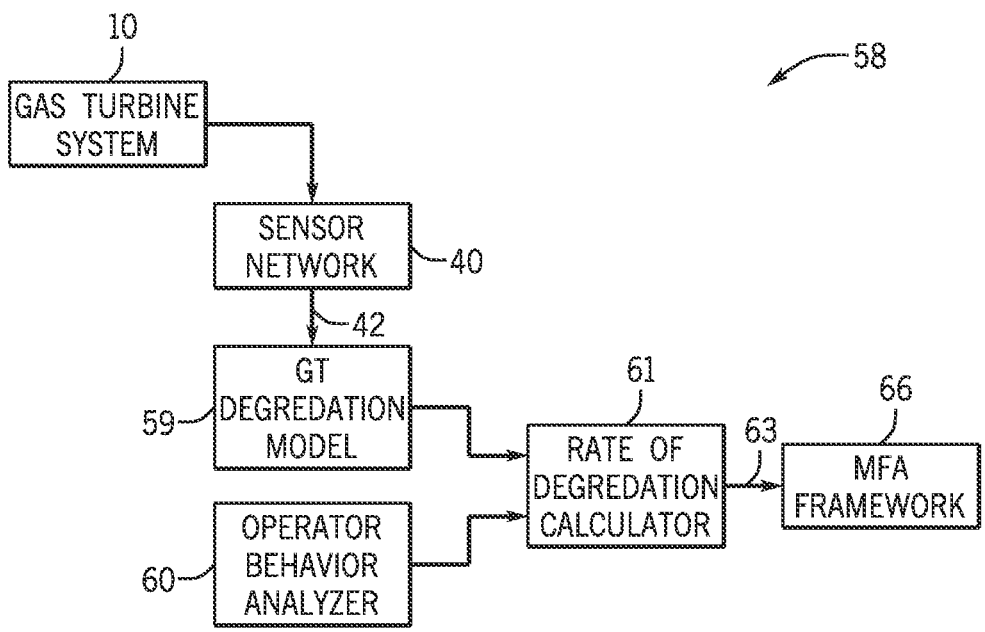
FIG. 3 is a block diagram depicting the control system of FIG. 1 as incorporating a degradation mode, in accordance with an embodiment.

FIG. 3 is a block diagram depicting a portion of the control system 44 of FIG. 1 including details of the performance degradation analyzer 58. The performance degradation analyzer 58 includes a gas turbine degradation model 59. This gas turbine degradation model 59 may utilized the received sensor output 42 including the heat rate of the gas turbine 10. Based on the received sensor output 42, degradation characteristics may be selected (e.g., from a lookup table or other location) or generated on the fly (in real time or near real time). The degradation characteristics may be from the degradation model 59 may be sent to a rate of performance degradation calculator 61.

Additionally, the performance degradation calculator 61 may receive an indication from the operator behavior analyzer 60. The operator behavior analyzer 60 may generate an indication of how a user is operating the gas turbine (e.g., tendencies in operation of the gas turbine such as mild, aggressive, conservative etc.) engine of the turbine system 10 and, for example, may be selected (e.g., from a lookup table or other location) or generated on the fly (in real time or near real time). The indication of the use of the gas turbine engine of the turbine system 10 may be transmitted to the performance degradation calculator 61.

Thus, as noted above, the rate of performance degradation calculator 61 receives the output of the models 59 and 60. These received outputs may be utilized by the performance degradation calculator 61 to determine rates of performance degradation 63 experienced by the gas turbine engine of the turbine system 10 according to various operating modes. In one instance, the primary operating modes or conditions may include transient (e.g., starting and stopping) and stead state (e.g., operating) conditions. These rates of performance degradation 63 may be utilized in a model-free adaptive framework 66, as will be discussed in greater detail with respect to FIG. 6.

Figure 4:
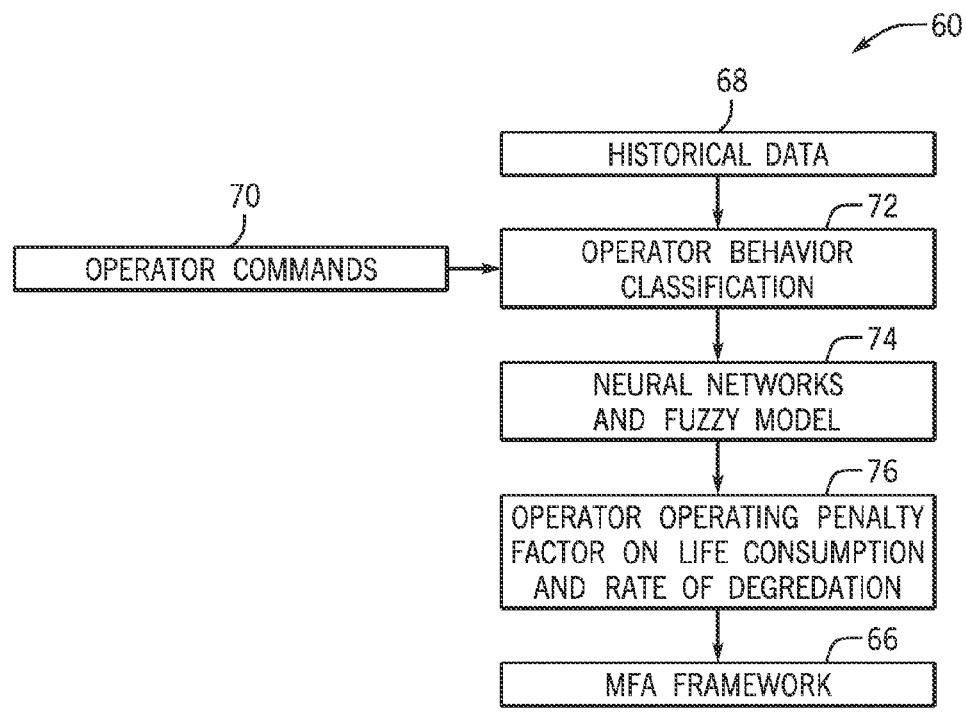
FIG. 4 is a block diagram depicting the control system of FIG. 1 as incorporating an operator behavior mode, in accordance with an embodiment.
Figure 5:
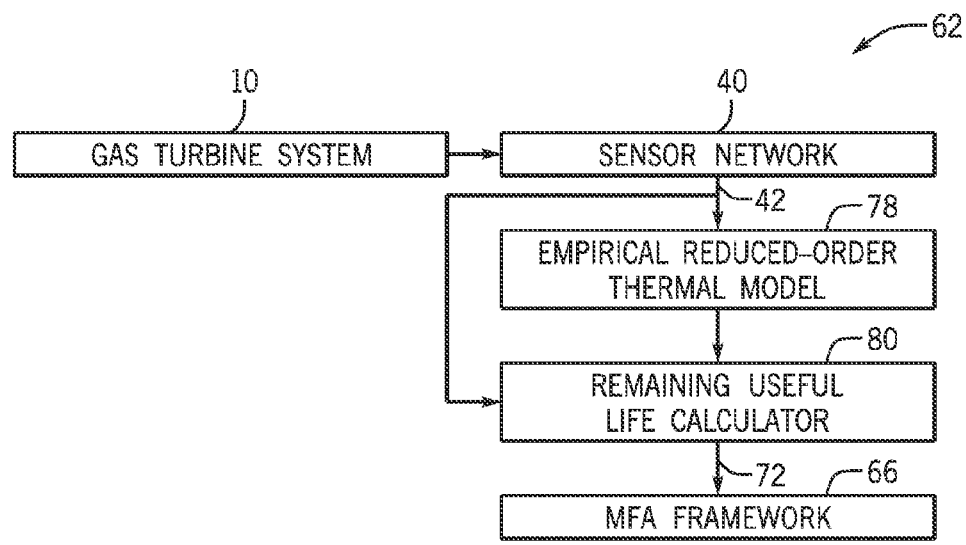
FIG. 5 is a block diagram depicting the control system of FIG. 1 as incorporating a thermal model, in accordance with an embodiment.

FIG. 4 depicts a portion of the control system 44 related to the operator behavior analyzer 60 discussed above. The operating behavior analyzer 60 receives historical data 68 and data related to the real-time operator commands 70. The analyzer 62 then creates an operator behavior classification 72 that includes different ranges based on the historical data 68 and data related to the real-time operator commands 70. For example, in some embodiments, the operator behavior classifications 72 may include aggressive, mild, and defensive categories. The classification and segmentation results are submitted to fuzzy logic system (e.g., neural networks) 74 which compute an operator behavior penalty factor 76 specific to the operator being analyzed. This penalty factor 76 takes into account how the behavior of the operator affects the life consumption and rate of degradation of the gas turbine system 10 and for model-based controls may translate into a credit or debit in performance calculations. As shown, in the present embodiments, the penalty factor 176 is output to the model-free adaptive network 66.

Additional analysis may be undertaken by the control system 44. FIG. 4 is a block diagram illustrating the thermal analyzer 62 that provides input to the model-free adaptive framework 66. The thermal analyzer 62 may include an empirical reduced-order thermal model 78 and a remaining useful life calculator 78. The empirical reduced-order thermal model 78 may utilize information from the sensor output 42 of the gas turbine system 10, whereby the information may include the gas turbine metal temperatures of various gas turbine components (e.g., the rotor, casing, bucket, nozzle, and transition piece). In some embodiments, the model 78 may include information, such as stress/strain curves, etc of the various turbine components. Likewise, the model 78 may utilize the above discussed information to calculate the metal temperatures at various locations, such as critical locations (e.g., high importance locations to the operation of the gas turbine system 10 or locations most likely to fail during operation of the gas turbine system 10).

The output of the empirical reduced-order thermal model may be utilized by the remaining useful life calculator 78. In some embodiments, the remaining useful life calculator 80 may also receive an indication of sensor output 42. The remaining useful life calculator 80 may calculate the remaining useful life 106 of the various components of the turbine system 10 based upon the sensor outputs 42 and the information received from the empirical reduced-order thermal model 78, which may then be input into the model-free adaptive framework 66 as results 72.

Figure 6:
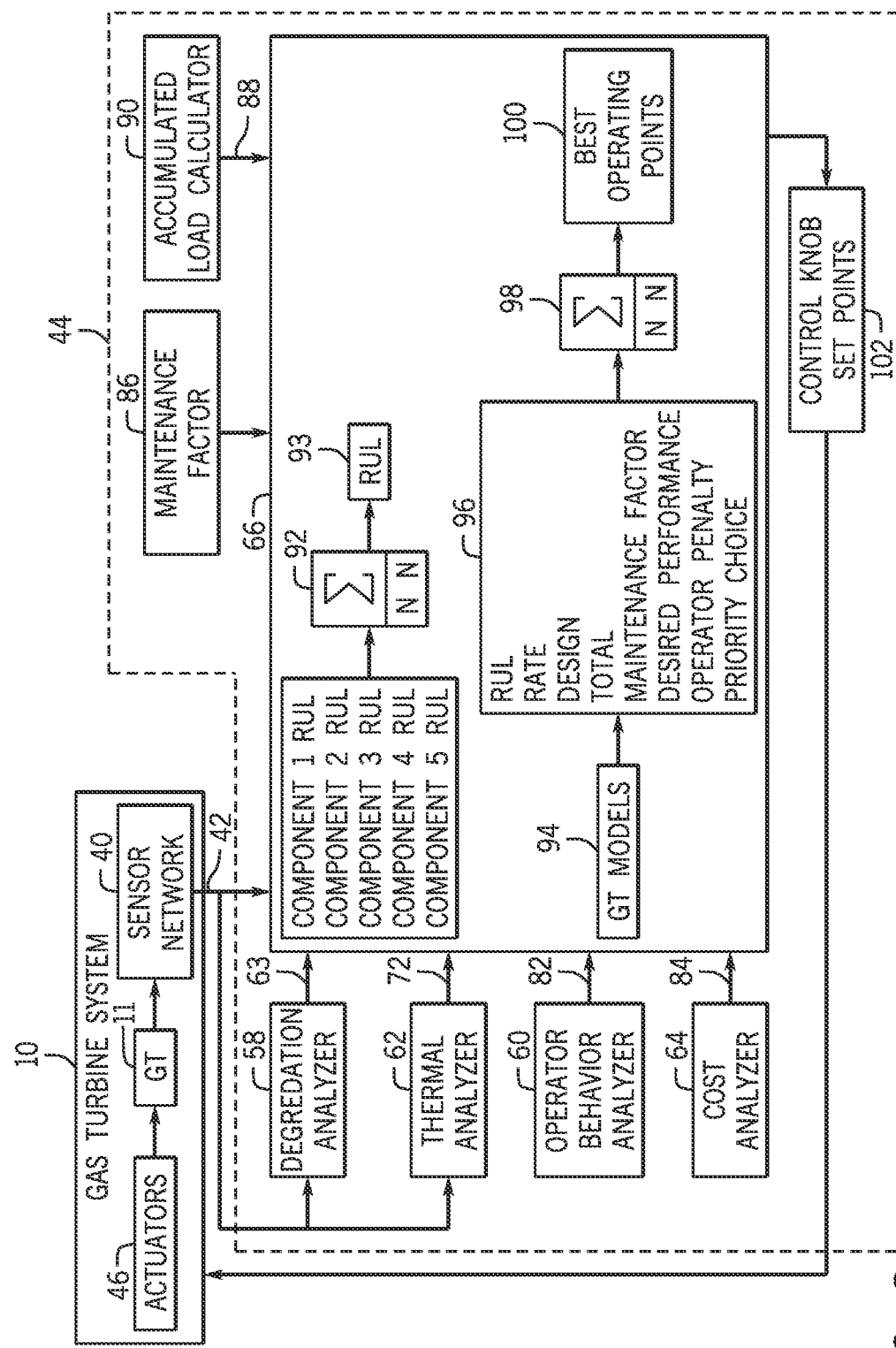
FIG. 6 is a block diagram depicting an embodiment of the gas turbine and operationally flexible control system of FIG. 1, as illustrating details of a model-free adaptive framework, in accordance with an embodiment.

FIG. 6 is a block diagram illustrating an embodiment of gas turbine and control system of FIG. 1, showing details of the model-free adaptive framework 66. The framework 66 receives multiple sets of input. As discussed above, the degradation analyzer 58 receives heat rates and other sensor output from the sensor network 42 as well as the output of the operator behavior analyzer 60 and calculates degradation rates 63 for various operating conditions. The framework 66 also receives remaining useful life 72 calculations for various components of the gas turbine system 10 from the thermal analyzer 62. Operator penalty factors 82 calculated by operator behavior analyzer 60 and total cost data 84 based upon, for example, costs of operation of the gas turbine system 10 as derived by the cost analyzer 64, also may be provided to the framework 66 as inputs.

In some embodiments, the total cost data 84 is calculated by the cost analyzer 64 through use of an analysis and aggregation of data related to fuel costs, amortization costs, and maintenance costs. These costs may be a combination of historical data stored on the storage 56 of the control system 44, and real-time data received from an external source such as a network accessing market data and/or enterprise-specific data.

Maintenance factors 86, as well as accumulated load data 88, may be additional inputs to the model-free adaptive framework 66. The maintenance factors may include frequency of maintenance due for the gas turbine system 10, length of time to perform maintenance of various portions of a gas turbine engine 11, or other factors related to the upkeep of the gas turbine system 10. Accumulated load data 88 may be an aggregation of data including historical data describing the load over time as well as the ramp rate of the gas turbine system 10 and may be provided by the accumulated load calculator 90.

Within the model-free adaptive framework, the remaining useful life 63 of the various components received from the degradation analyzer 58 are input into a fuzzy logic system 92 (e.g., a neural network) to compute an aggregate remaining useful life 93 of, for example, the gas turbine system 10. Likewise, gas turbine models 94 (e.g., Gate Cycle, ARES, EMAP) within the model-free adaptive framework 66 may, for example, emulate the gas turbine engine 11 and/or generate an efficiency map of the gas turbine engine 11 at steady state operation. These values may be output to the adapted parameters aggregator 96, which may include a gas turbine remaining useful life, rate of degradation, design limits, total cost, maintenance factor, desired performance, operator penalty, and priority decisions (which may be related to one or more of life of the gas turbine engine 11, performance of the gas turbine engine 11, or based on external demands).

The adapted parameters aggregator 96 may output the aggregated information discussed above to the fuzzy logic and optimization system 98 that may include, for example a neural network that produces best (optimal or increased efficiency) operating points 100 for the gas turbine system. These best operating points 100 may then be output as set points 102 for control knobs available to the gas turbine operator. In one embodiment, the control knobs may be virtual controls available to the operator on the workstation 54 display that effect physical changes on the actuators 46 of the gas turbine system 10.

Figure 7:
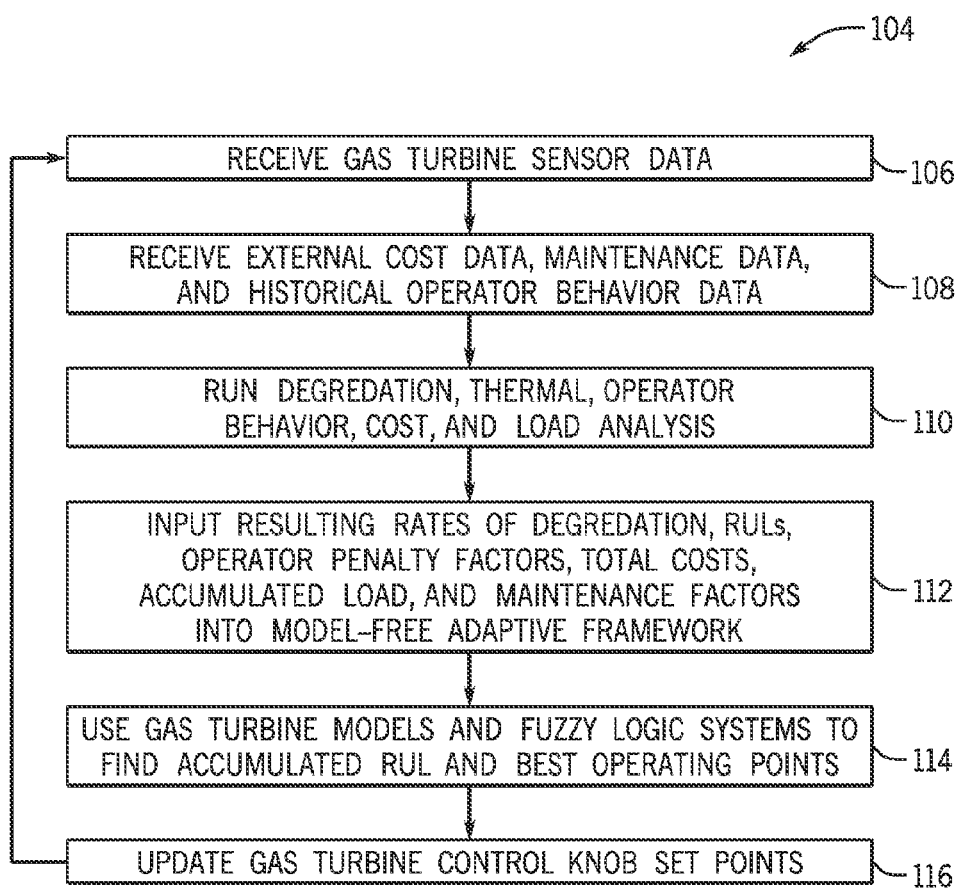
FIG. 7 is a flow chart depicting a process for providing operational flexibility for the gas turbine engine of FIG. 1 that may be performed by the control system of FIG. 1, in accordance with an embodiment.

FIG. 7 illustrates an embodiment of a process 104 for providing operational flexibility for a gas turbine engine that may be performed by the control system 44 of FIG. 1. In step 106, the control system 44 receives sensor data 42 from the sensor network 40 of the gas turbine system 10. In step 108, the control system 44 receives data that may be external to the gas turbine system 10 and may be stored on the storage 56 of the control system. This external data may include historical and real-time cost data, maintenance data, and historical operator behavior data. In step 110, the control system 44 inputs the received data into the various analyzers to complete degradation, thermal, operator behavior, costs, and load analyses. The data resulting from the analyses, including rates of degradation, remaining useful life data, operator penalty factors, total costs, accumulated load and maintenance factors, are input into the model-free adaptive framework, as shown in step 112.

In step 114, the model-free adaptive framework uses gas turbine models and fuzzy logic systems (e.g., neural networks) to find an accumulated remaining useful life and best operating points. The control system 44 then updates control knob set points in step 116. As shown, the process may begin again at step 106, whereby updated sensor data 42 is received by the control system 44. This process 104 may be initiated automatically, for example set to run on a pre-set scheduled basis, or may be manually initiated by the operator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A device configured to:
   receive sensed operation parameters related to the operation of a machine;
   utilize the sensed operation parameters in a first analyzer configured to generate first characteristics related to degradation of the machine;
   utilize the sensed operation parameters in a second analyzer configured to generate second characteristics related to thermal characteristics of the machine, wherein the thermal characteristics include thermal stresses present in the machine;
   utilize the first characteristic related to degradation of the machine, the second characteristics related to thermal characteristics of the machine, and a third characteristic related to operator behaviors related to the current operation of the machine to generate remaining useful life characteristics of components of the machine, wherein the third characteristic is based on a behavior classification derived from historical data and an operator command and associated with a behavior category of a plurality of behavior categories indicative of a manner by which the machine is and has been operated by a user; and
   generate operational set points for control of the machine based in part on the remaining useful life characteristics, desired machine performance characteristics based on the operator behaviors, and maintenance characteristics of the machine, wherein the operational set points cause adjustment of one or more actuators for control of the machine.

2. The device of claim 1, wherein the device is configured to utilize a neural network to generate the remaining useful life characteristics of components of the machine.

3. The device of claim 1, wherein the device is configured to receive the sensed operation parameters in real time.

4. The device of claim 1, wherein the device is configured to analyze an operational behavior of the machine based upon user settings indicating the operator behaviors and generate an indication of the operational behavior of the machine.

5. The device of claim 4, wherein the device is configured to analyze a cost of operation of the machine and generate an indication of the cost of operation of the machine.

6. The device of claim 5, wherein the device is configured to generate the operational set points for control of the machine based in part on the indication of the cost of operation of the machine.

7. The device of claim 6, wherein the device is configured to generate the operational set points for control of the machine based in part on design margins related to the capacity and capabilities of the machine.

8. The device of claim 1, wherein the device is configured to utilize a neural network to generate the operational set points for control of the machine.

9. The device of claim 1, wherein the machine comprises a power generation unit.

10. The device of claim 1, wherein the device is configured to utilize a neural network to generate an operating penalty factor derived from the behavior classification as the third characteristic, wherein the operating penalty factor comprises a credit or debit in performance calculations of the machine.

11. An article of manufacture, comprising:
a tangible non-transitory machine-readable media having encoded thereon processor-executable instructions comprising:
instructions to receive sensed operation parameters related to the operation of a machine;
instructions to apply the sensed operation parameters in a first analyzer configured to generate first characteristics related to degradation of the machine;
instructions to apply the sensed operation parameters in a second analyzer configured to generate second characteristics related to thermal characteristics of the machine, wherein the thermal characteristics include thermal stresses present in the machine;
instructions to apply the characteristic related to degradation of the machine, the second characteristics related to thermal characteristics of the machine, and a third characteristic related to operator behaviors related to the current operation of the machine to generate remaining useful life characteristics of components of the machine, wherein the third characteristic is based on a behavior classification derived from historical data and an operator command and associated with a behavior category of a plurality of behavior categories indicative of a manner by which the machine is and has been operated by a user; and
instructions to generate operational set points for control of the machine based in part on the remaining useful life characteristics, desired machine performance characteristics based on the operator behaviors, and maintenance characteristics of the machine, wherein the operational set points cause adjustment of one or more actuators for control of the machine.

12. The article of manufacture of claim 11, comprising instructions to analyze an operational behavior of the machine based upon user settings and generate an indication of the operational behavior of the machine.

13. The article of manufacture of claim 12, comprising instructions to analyze a cost of operation of the machine and generate an indication of the cost of operation of the machine.

14. The article of manufacture of claim 13, comprising instructions to generate the operational set points for control of the machine based in part on the indication of the cost of operation of the machine.

15. The article of manufacture of claim 14, comprising instructions to generate the operational set points for control of the machine based in part on design margins related to the capacity and capabilities of the machine.

16. The article of manufacture of claim 11, comprising instructions to transmit an indication of the operational set points for control of the machine.

17. A tangible non-transitory machine-readable media comprising code configured to:
determine total remaining useful life of components of a machine based at least upon thermal stresses in the machine;
determine a first degradation factor of the machine due to operator behaviors related to current operation of the machine, wherein the first degradation factor is based on a behavior classification derived from historical data and an operator command and associated with a behavior category of a plurality of behavior categories indicative of a manner by which the machine is and has been operated by a user;
determine a second degradation factor related to the a duration of time that the machine is active;
determine operating costs of the machine related to operation of the machine;
determine system losses at transients and steady state operation based on the operation of the machine; and
utilize the total remaining useful life, the first degradation factor, the second degradation factor, the operating costs, and the system losses to generate operational set points for control of the machine, wherein the operational set points cause adjustment of one or more actuators for control of the machine.

18. The tangible non-transitory machine-readable media of claim 17 comprising a neural network to generate the total remaining useful life of components of the machine.

19. The tangible non-transitory machine-readable media of claim 17 comprising a neural network to generate the operational set points for control of the machine.

20. The tangible non-transitory machine-readable media of claim 17, wherein the code is configured to transmit an indication of the operational set points for control of the machine.

* * * * *